United States Patent [19]

Haberl et al.

[11] Patent Number: 4,566,391
[45] Date of Patent: Jan. 28, 1986

[54] SUPPORT WHEEL FOR A CAMERA DOLLY

[75] Inventors: Karl Haberl; Klaus Resch, both of Munich, Fed. Rep. of Germany

[73] Assignee: Schmidle & Fitz, Film-Gerate-Verleih, Munich, Fed. Rep. of Germany

[21] Appl. No.: 576,756

[22] Filed: Feb. 3, 1984

[30] Foreign Application Priority Data

Feb. 4, 1983 [DE] Fed. Rep. of Germany ....... 3303822

[51] Int. Cl.⁴ ............................................. B61F 1/00
[52] U.S. Cl. ............................. 105/215 R; 104/1 A; 280/91
[58] Field of Search ............... 105/215 R, 215 C, 144; 104/247, 119, 1 A; 280/91; 74/496

[56] References Cited

U.S. PATENT DOCUMENTS

| 2,544,924 | 3/1951 | Herold | 104/1 A |
| 3,018,116 | 1/1962 | Summers et al. | 280/91 |
| 3,120,821 | 2/1964 | Bingham | 105/215 C |
| 3,297,337 | 1/1967 | Sargent | 280/91 |
| 4,257,619 | 3/1981 | Fisher | 280/91 |

FOREIGN PATENT DOCUMENTS 1210035  3/1960  France ............................. 105/215 C Primary Examiner—Harry B. Tanner
Attorney, Agent, or Firm—Holman & Stern

[57] ABSTRACT

A support wheel device for a camera dolly, comprising four wheel suspension supports (1) each of which is disposed on the frame of the dolly at respective corners of a rectangle and on each of which at least one ground wheel (4) and at least one rail wheel (7) are rotatably mounted and each support is releasably rigidly connectable to a corresponding steering shaft (11) extending perpendicularly to the plane of the rectangle, and the shafts are also connected to a steering mechanism which serves to rotate the four steering shafts (11) in a rotationally synchronous and uniform manner. In order to enable the camera dolly to be run along arbitrarily curved rail paths, as well as on the ground wheels, the invention provides that the wheel suspension support (1) may be coupled to its steering shaft by a disengageable coupling (15, 16), whereby in the disengaged position the rigid connection between the wheel suspension support and the steering shaft is released.

17 Claims, 4 Drawing Figures

SUPPORT WHEEL FOR A CAMERA DOLLY

BACKGROUND OF THE INVENTION

1. Field of the Invention

The invention relates to a support device for a camera dolly, comprised of four suspension supports each of which is disposed on the frame of the dolly at the respective corners of a rectangle and on each of which at least one ground wheel and at least one rail wheel are rotatably mounted so that the axes of the wheels are in planes parallel to the plane of the rectangle. Each support is rotatably releasably connected to a corresponding steering shaft extending perpendicularly to the plane of the rectangle, the connection being such that in a locked position rotation between the shaft and support cannot occur. Each support is also connected to a steering mechanism which serves to rotate the four steering shafts in rotationally synchronous fashion in the unlocked position.

2. Description of the Prior Art

A camera dolly equipped with a support wheel device of known type is operated by rolling it over the ground with the aid of ground wheels, or on rails. Whereas the steering mechanism operates to steer the camera dolly in the desired direction when the ground wheels are employed for the rolling motion, steering becomes unnecessary when the dolly moves on rails by means of the rail wheels, because the direction of movement of the dolly is then controlled by the rails themselves. Since with the known support wheel device the four steering shafts are coupled, e.g. by a chain drive which engages all four shafts in the same manner and degree whereby said coupling is such that all four steering shafts are caused always to turn through equal angles, it is impossible under this coupling constraint for the suspension to negotiate a non-straight rail configuration, because, e.g., in a curved section of rail adjoining a straight section, the rail wheels disposed on the curved section are forced into a different angle of rotation with respect to the longitudinal axis of the dolly than are the rail wheels disposed on the adjoining straight section. This constitutes a major drawback. Thus, the common steering of all four steering shafts, which is a necessary condition for easy steerability of the camera dolly when supported on the ground wheels, becomes a hindrance to guiding of the dolly on curved rails via the rail wheels.

BRIEF SUMMARY OF THE INVENTION

The object of the invention is to provide a support wheel device for a camera dolly, having characteristics whereby the camera dolly will not only be readily and freely steerable when moving on its ground wheels but also can be moved on its rail wheels along a curved rail path.

This object is achieved according to the invention in that each wheel suspension support is coupled to its steering shaft by a disengageable coupling, whereby in the disengaged position the rotationally rigid connection between the wheel suspension support and the steering shaft is released.

In the support wheel device of this invention, in the case of movement on the ground wheels the coupling is in its engaged position, in which the four steering shafts are rotationally rigidly connected to their respective wheel suspension supports, so that a steering motion imparted by the steering mechanism is uniformly transmitted, i.e., to the same degree, and by the same manner, to all four wheel suspension supports, whereby all ground wheels undergo the same angular steering excursion (deflection or turning). On the other hand, in the case of movement on the rail wheels guided by rails, the couplings of all the wheel suspension supports are disengaged, whereby the rotationally rigid connections between the individual wheel suspension supports and their respective steering shafts are released, and thus the individual wheel suspension supports can mutually independently assume the steering angles imposed by the local rail curvature, namely the angles of the respective tangents thereto.

A preferred embodiment of the invention is characterized in that the coupling comprises a pin which is slidably guided in a direction radial to the steering shaft, which pin in the engaged position engages and interlocks with a radially directed locking opening provided in the steering shaft, and which pin in the disengaged position is retracted out of the locking opening. This embodiment is distinguished by its simple structure. Due to the engagement of the pin in the locking opening, the coupling between the steering shaft and wheel suspension support achieves identity of angular excursion at all times.

In a refinement of this embodiment it has proved advantageous for the locking opening to have a conical shape, with the larger cone diameter facing the outer end of the pin, which end has a configuration complementary to said cone or frustum thereof. This arrangement greatly facilitates the engagement of the coupling, because the conically flared locking opening provides a funnel-like guideway for the movement of the pin with the conical end into the engaged position.

It has also proven advantageous for the pin to be spring loaded in the direction toward the locking opening, whereby the pin will be securely held in place in the engaged position of the coupling, and also the release of the pin under the spring force acting toward the locking opening will result in automatic engagement of the coupling by the action of the spring.

It is also advantageous for the pin to be fixable to the wheel suspension support when the pin is in the disengaged position. This is achieved by catching of a stop dog against a detent, wherewith the dog is rigidly connected to the pin and the detent is provided on the wheel suspension support. This provides a means of maintaining the coupling in the disengaged position.

An advantageous refinement with respect to the disposition of the locking opening is for said opening to be disposed in a locking ring which is rotationally rigidly mounted on the steering shaft. A particularly advantageous measure employed in connection with this refinement is in providing the locking ring with a radial slot running diametrically opposite to the locking opening in an axial plane which includes the axis of the locking opening, and further with a set screw disposed along a secant of the locking ring and extending across the slot, which set screw clamps said ring to the steering shaft. This enables precise adjustment and fixing of the relative rotational angles of the locking opening and the steering shaft.

BRIEF DESCRIPTION OF THE DRAWINGS

Additional features, details, and advantages of the invention will be apparent from the following detailed description with reference to the accompanying drawings wherein.

DETAILED DESCRIPTION

Figure 1:
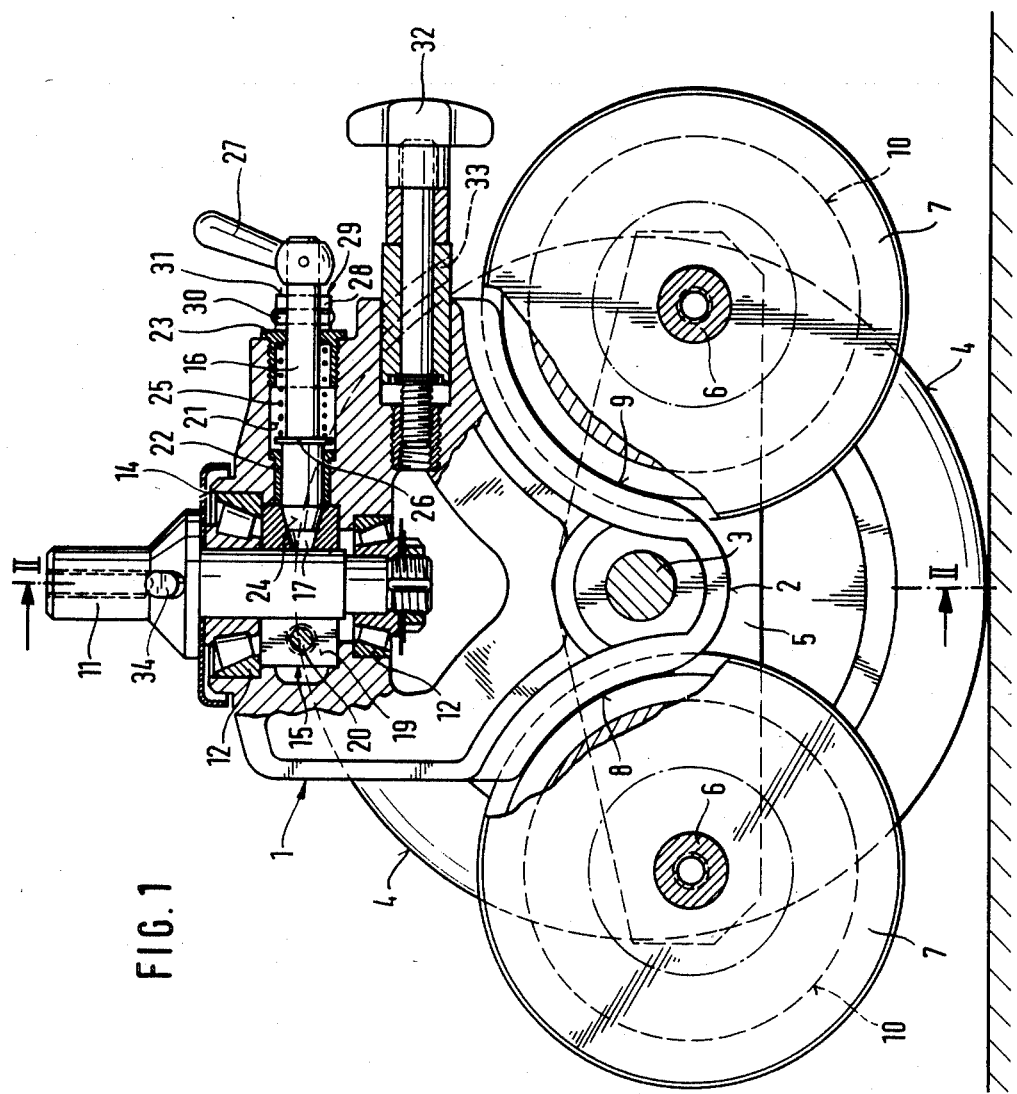
FIG. 1 is a longitudinal cross-sectional view of the support wheel device for a camera dolly in accordance with the invention taken along line I—I of FIG. 2.
Figure 2:
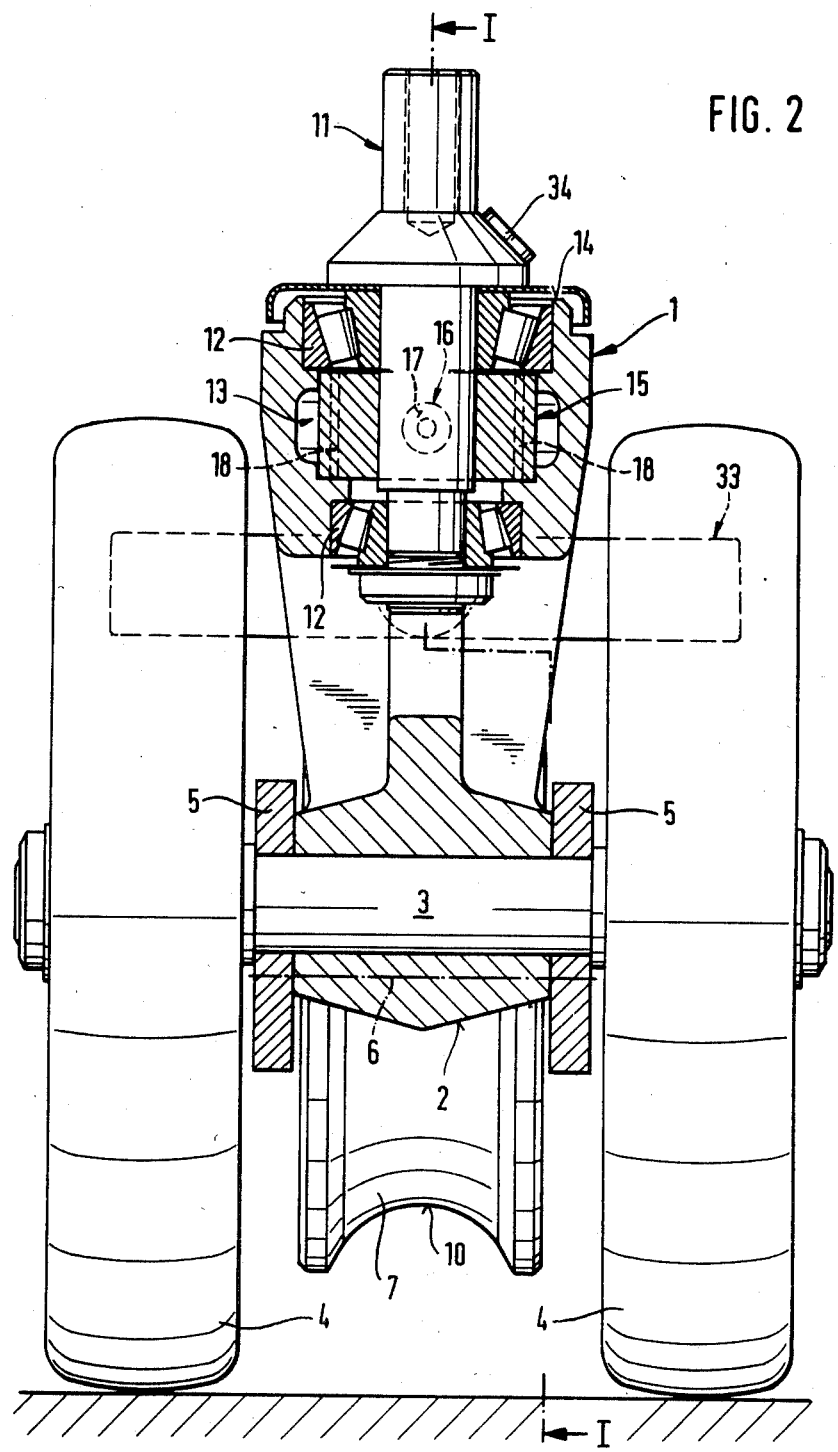
FIG. 2 is an enlarged cross-sectional view taken along line II—II of FIG. 1.

As may be seen from FIGS. 1 and 2, a wheel suspension support 1 comprised of a cast piece and having the general outer shape of a parallepiped is provided with a wheel axle 3 at a location near the midpoint of the narrow side 2 of support 1, which axle extends through the support 1 in the direction of its minimum thickness. Both ends of axle 3 project beyond the support 1. On each of these ends a ground wheel 4 is rotatably mounted by means of grooved ball bearings. A bearing plate 5 of elongated shape is provided between each ground wheel 4 and the corresponding wheel suspension support 1. Wheel axle 3 also extends through plate 5 which extends perpendicularly to the axis and on both sides of axle 3, the arms of plate 5 thus formed being of equal length. Between the corresponding facing free ends of the two plates 5, additional wheel axles 6 are disposed which extend parallel to wheel axle 3 and which have rotatably mounted thereon rail wheels 7 by means of grooved ball bearings. Recesses in the shape of quarter circles, i.e., quarter circular sectors, are provided in the parallelepiped shape of the support 1 in the region of side surface 2 and the adjoining side surfaces 8 and 9, which recesses conform to the concave peripheral grooves 10 in rail wheels 7, so that the distance between the two rail wheels 7 can be kept relatively small.

As can be seen particularly from FIG. 2, the ground wheels 4 are equipped with tires suitable for facilitating rolling motion on the ground. The running peripheral groove surfaces 10 of the rail wheels 7 have a concave cross-section, whereby they roll on rails having a round cross-section.

A steering shaft 11 is rotatably mounted by means of two tapered roller bearings 12 in a hole 13 in the support 1, which shaft 11 extends perpendicularly to the wheel axis 3 and to the imaginary line joining the centers of the additional wheel axes 6, and which shaft 11 further extends outward, away from wheel axle 3, from side surface 14 of the parallelepiped-shaped support 1, which surface 14 is disposed opposite to side surface 2. The steering shaft 11 is provided with a disengageable coupling which in its engaged position joins the steering shaft 11 rotationally rigidly with the wheel suspension support 1, and in its disengaged position rotates freely with respect to support 1. In the exemplary embodiment shown, this coupling comprises a locking ring 15, shown in greater detail in FIG. 3, and a pin 16 shown in FIG. 1.

Figure 3:
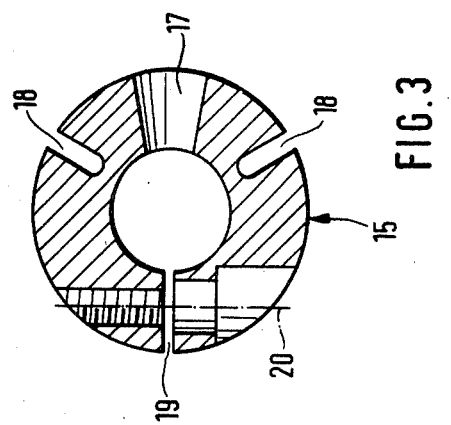
FIG. 3 is a cross-sectional view taken perpendicular to the central axis at mid-length through a locking ring provided with the support wheel device of FIGS. 1 and 2.

As may be seen from the cross-section of locking ring 15 shown in FIG. 3, ring 15 is provided with a conical locking opening 17 with its greater diameter disposed on the radially outer side. In addition, radial flexibility slots 18 are provided on both sides of locking opening 17 along the circumference, which slots open out into the outer circumferential surface of locking ring 15 and increase the elasticity of said ring in the circumferential direction.

The locking ring 15 is also split by a radial slot 19 which is diametrically opposite to the central axis of the conical locking opening 17. A set screw 20 extending along a secant of ring 15 passes perpendicularly through slot 19. As may be seen in particular from FIGS. 1 and 3, the locking ring 15 is tightened with the aid of set screw 20 in a position between the two tapered roller bearings 12 so as to be rotationally rigidly connected to the steering shaft 11.

Further (FIG. 1), the pin 16 is mounted by means of glide bearings 22 and 23 so as to be axially slidable, in a hole 21 in support 1, which hole is directed radially with respect to the steering shaft 11, and coaxially with respect to locking opening 17, so that the conically shaped end 24 of pin 16 is directed toward the locking opening 17 to match the shape of opening 17 to interfit therein. A compression spring 25 presses on one end against a detent ring 26 attached to pin 16, which ring 26 is disposed radially outwardly of glide bearing 22 with respect to the steering shaft 11. The other end of spring 25 presses against an inner shoulder of glide bearing 23, which bearing 23 is screwed into the free outer end of hole 21. In this manner the pin 16 is resiliently urged in the direction toward the locking opening 17. In the engaged position of pin 16 shown in FIG. 1, the end 24 of pin 16 is pressed into locking opening 17.

When pin 16 is retracted by means of its hand grip 27 disposed on the free outer end of pin 16 opposite its conical end 24, the end 24 is released from engagement with locking opening 17. At the same time, a pin 30 which passes diametrically through pin 16 near hand grip 27 has associated with it a machanism (not shown) whereby a small angular rotation of pin 16 can bring about, through said mechanism, the catching of pin 30 on the free outer end 31 of a ring-shaped axial extension 29 of bearing 23. In this connection, pin 30 is normally slidably guided in an axial groove or slot in the end of extension 29, as in a typical bayonet slot and pin arrangement and pin 16 extends out beyond the free end 31 of extension 29.

The other hand grip 32 shown in FIG. 1 serves merely to press a suitably shaped brake plate 33 against the ground wheels 4 for braking or holding purposes.

Figure 4:
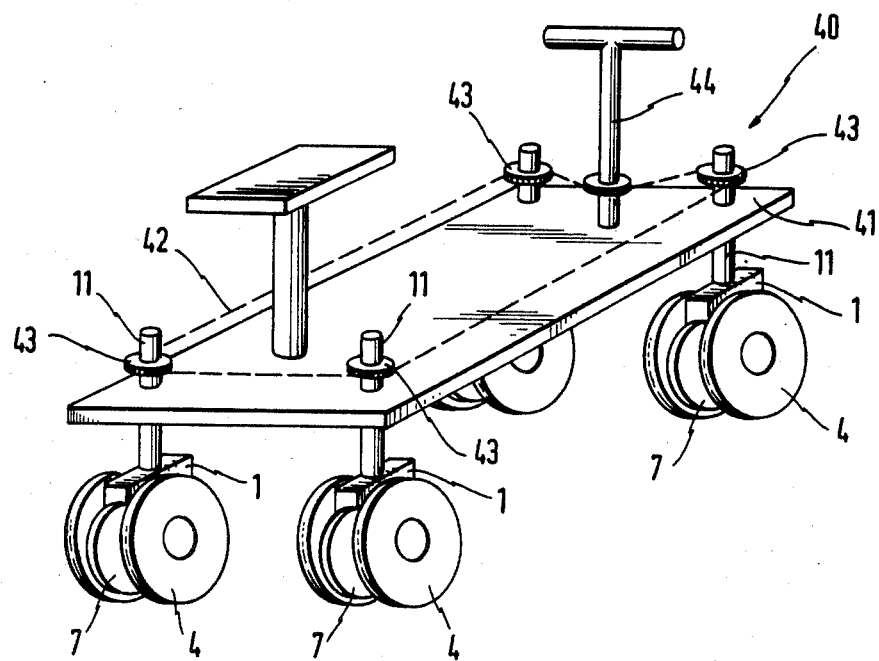
FIG. 4 is a schematic view of a camera dolly including a frame on which a plurality of the support wheel devices of FIG. 1 are operatively mounted.

As schematically shown in FIG. 4, a support wheel device for a camera dolly 40 has four of the units shown in FIGS. 1 and 2, disposed on the frame (chassis) 41 of the camera dolly at respective corners of a rectangle, so as to support said dolly. The steering shafts 11 which extend perpendicularly to the plane of the rectangle are coupled, e.g. by means of a common chain drive 42 which engages sprocket wheels 43 which are rotationally rigidly attached to the respective steering shafts 11, whereby said coupling produces rotation of all four steering shafts 11 over the same rotational angle when the steering mechanism 44 is actuated. When the coupling is engaged, all four wheel suspension supports 1 thus experience the same angular steering excursion (i.e., deflection), as is desirable for free mobility of the camera dolly when rolling on the ground wheels 4. If, however, the dolly is moved on guide rails over which the rail wheels 7 roll, the coupling is disengaged, so that the individual wheel suspension supports 1 are completely decoupled from their respective steering shafts 11, and can adjust independently to the turning forces applied by the guide rails.

Finally, FIGS. 1 and 2 show an adjustable spring 34, which serves to couple the steering shaft 11 with the steering mechanism of the camera dolly.

We claim:

1. A suspension support for a camera dolly comprising:
   a support member;
   a ground wheel axle mounted in said support member;
   at least one ground wheel rotatably mounted on said ground wheel axle to movably support said dolly on the ground;
   at least one rail wheel axle mounted on said support member;
   at least one rail wheel rotatably mounted on said at least one rail wheel axle to movably support and guide said dolly on a rail;
   a steering shaft rotatably mounted on said support member with its axis of rotation extending substantially perpendicular to said ground wheel axle; and
   a releasable coupling means to fixedly couple said steering shaft to said support member when said support member is movable on said at least one ground wheel and to release said steering shaft for free rotation when said support member is movable and guided on said at least one rail wheel comprising, a locking ring rotatably mounted on said steering shaft, and clamping means operatively associated with said ring to releasably clamp said ring non-rotatably onto said shaft, said locking ring being provided with an opening having a central axis extending substantially radially with respect to said shaft, and a locking pin slidably guided in said support member for reciprocating movement in a direction substantially radially with respect to said shaft and having an inner end aligned with said locking opening, so that said inner end is engageable in said locking opening to lock said steering shaft in a non-rotatable locked position with respect to said support member and is retractable out of engagement with said locking opening in an unlocked position for free rotation of said shaft.

2. A suspension support as claimed in claim 1 wherein said inner end of said locking pin has a frusto-conical shape with the smaller base at the end of said pin and said locking opening has a frusto-conical configuration substantially complementary to the shape of said inner end.

3. A suspension support as claimed in claim 2 and further comprising spring means operatively disposed between said support member and said locking pin to resiliently urge said locking pin toward said locked position.

4. A suspension support as claimed in claim 1 wherein said clamping means comprises a radial slot in said locking ring disposed substantially diametrically opposite to said locking opening, and set screw means operatively provided in said locking ring and extending through said slot substantially perpendicular thereto so that tightening of said set screw reduces the width of said slot to clamp said ring onto said steering shaft.

5. A suspension support as claimed in claim 4 wherein said locking ring is mounted within a bore hole in said support member, counter bores are provided in said support member at opposite ends of said bore hole and steering shaft bearings are mounted in said counter bores to rotatably support said shaft.

6. A support device for a camera dolly having a rectangular frame comprising;
   four suspension support members disposed on the frame of the dolly at respective corners thereof;
   at least one ground wheel axle mounted on each support member;
   at least one ground wheel rotatably mounted on each ground wheel axle;
   at least one rail wheel axle mounted on each support member to movably support and guide said dolly on rails;
   at least one rail wheel rotatably mounted on each rail wheel axle;
   the rotational axes of said wheels extending parallel to the plane of the rectangular frame;
   a steering shaft rotatably mounted in each support member with its rotational axis extending perpendicular to the plane of the rectangle;
   a steering mechanism operatively connected to said shafts to rotate said shafts synchronously and uniformly; and
   a releasable coupling means operatively mounted on at least one of said support members to fixedly couple said steering shafts to each respective support member when said dolly is movable on said ground wheels and to release said steering shafts for free rotation when said dolly is movable and guided on said rail wheels comprising, a locking ring rotatably mounted on said steering shaft, and clamping means operatively associated with said ring to releasably clamp said ring non-rotatably onto said shaft, said locking ring being provided with an opening having a central axis extending substantially radially with respect to said shaft, and a locking pin slidably guided in said support member for reciprocating movement in a direction substantially radially with respect to said shaft and having an inner end aligned with said locking opening, so that said inner end is engageable in said locking opening to lock said steering shaft in a non-rotatable locked position with respect to said support member and is retractable out of engagement with said locking opening in an unlocked position for free rotation of said shaft.

7. A suspension support as claimed in claim 6 wherein said inner end of said locking pin has a frusto-conical shape with the smaller base at the end of said pin and said locking opening has a frusto-conical configuration substantially complementary to the shape of said inner end.

8. A suspension support as claimed in claim 6 and further comprising spring means operatively disposed between said at least one support member and said locking pin to resiliently urge said locking pin toward said locked position.

9. A suspension support for a camera dolly comprising:
   a support member;
   a ground wheel axle mounted in said support member;
   at least one ground wheel rotatably mounted on said ground wheel axle to movably support said dolly on the ground;
   at least one rail wheel axle mounted on said support member;

at least one rail wheel rotatably mounted on said at least one rail wheel axle to movably support and guide said dolly on a rail;

a steering shaft rotatably mounted on said support member with its axis of rotation extending substantially perpendicular to said ground wheel axle; and a releasable coupling means to fixedly couple said steering shaft to said support member when said support member is movable on said at least one ground wheel and to release said steering shaft for free rotation when said support member is movable and guided on said at least one rail wheel comprising, a locking ring rotatably mounted on said steering shaft, and clamping means operatively associated with said ring to releasably clamp said ring non-rotatably onto said shaft, said locking ring being provided with a frusto-conical locking opening having a central axis extending substantially radially with respect to said shaft, a locking pin slidably guided in said support member for reciprocating movement in a direction substantially radially with respect to said shaft and having an inner end aligned with said locking opening having a frusto-conical shape with the smaller bore at the end of said pin, said locking opening being substantially complementary to the shape of said inner end, so that said inner end is engageable in said locking opening to lock said steering shaft in a non-rotatable locked position with respect to said support member and is retractable out of engagement with said locking opening in an unlocked position for free rotation of said shaft, spring means operatively disposed between said support member and said locking pin to resiliently urge said locking pin toward said locked position, and pin retaining means operatively arranged between said lockin pin and said support member to releasably retain said locking pin in said unlocked position.

10. A suspension support as claimed in claim 9 wherein said clamping means comprises a radial slot in said locking ring disposed substantially diametrically opposite to said locking opening, and set screw means operatively provided in said locking ring and extending through said slot substantially perpendicular thereto so that tightening of said set screw reduces the width of said slot to clamp said ring onto said steering shaft.

11. A suspension support as claimed in claim 4 wherein said locking ring is mounted within a bore hole in said support member, counter bores are provided in said support member at opposite ends of said bore hole and steering shaft bearings are mounted in said counter bores to rotatably support said shaft.

12. A support device for a camera dolly having a rectangular frame comprising:
four suspension support members disposed on the frame of the dolly at respective corners thereof;
at least one ground wheel axle mounted on each support member;
at least one ground wheel rotatably mounted on each ground wheel axle;
at least one rail wheel axle mounted on each support member to movably support and guide said dolly on rails;
at least one rail wheel rotatably mounted on each rail wheel axle;
the rotational axes of said wheels extending parallel to the plane of the rectangular frame;
a steering shaft rotatably mounted in each support member with its rotational axis extending perpendicular to the plane of the rectangle;

a steering mechanism operatively connected to said shafts to rotate said shafts synchronously and uniformly; and a releasable coupling means operatively mounted on at least one of said support members to fixedly couple said steering shafts to each respective support member when said dolly is movable on said ground wheels and to release said steering shafts for free rotation when said dolly is movable and guided on said rail wheels comprising, a locking ring rotatably mounted on said steering shaft, and clamping means operatively associated with said ring to releasably clamp said ring non-rotatably onto said shaft, said locking ring being provided with a frusto-conical locking opening having a central axis extending substantially radially with respect to said shaft, a lockin pin slidably guided in said support member for reciprocating movement in a direction substantially radially with respect to said shaft and having an inner end aligned with said locking opening having a frusto-conical shape with the smaller bore at the end of said pin, said locking opening being substantially complementary to the shape of said inner end, so that said inner end is engageable in said locking opening to lock said steering shaft in a non-rotatable locked position with respect to said support member and is retractable out of engagement with said locking opening in an unlocked position for free rotation of said shaft, spring means operatively disposed between said support member and said locking pin to resiliently urge said locking pin toward said locked position, and pin retaining means operatively arranged between said locking pin and said support member to releasably retain said locking pin in said unlocked position.

13. A suspension support as claimed in claim 12 wherein said clamping means comprises a radial slot in said locking ring disposed substantially diametrically opposite to said locking opening, and set screw means operatively provided in said locking ring and extending through said slot substantially perpendicular thereto so that tightening of said set screw reduces the width of said slot to clamp said ring onto said at least one steering shaft.

14. A suspension support as claimed in claim 12 wherein said locking ring is mounted within a bore hole in said at least one support member, counter bores are provided in said at least one support member at opposite ends of said bore hole and steering shaft bearings are mounted in said counter bores to rotatably support said at least one steering shaft.

15. A suspension support as claimed in claim 7 and further comprising spring means operatively disposed between said at least one support member and said locking pin to resiliently urge said locking pin toward said locked position.

16. A suspension support as claimed in claim 15 and further comprising pin retaining means operatively arranged between said locking pin and said at least one support member to releasably retain said locking pin in said unlocked position.

17. A suspension support as claimed in claim 7 wherein said clamping means comprises a radial slot in said locking ring disposed substantially diametrically opposite to said locking opening, and set screw means operatively provided in said locking ring and extending through said slot substantially perpendicular thereto so that tightening of said set screw reduces the width of said slot to clamp said ring onto said at least one steering shaft.

* * * * *